(12) United States Patent
Takahashi

(10) Patent No.: US 7,658,554 B2
(45) Date of Patent: Feb. 9, 2010

(54) CAMERA INSTALLATION DEVICE

(75) Inventor: Masami Takahashi, Kadoma (JP)

(73) Assignee: Panasonic Corporation, Osaka (JP)

( * ) Notice: Subject to any disclaimer, the term of this patent is extended or adjusted under 35 U.S.C. 154(b) by 247 days.

(21) Appl. No.: 10/597,360

(22) PCT Filed: Apr. 26, 2005

(86) PCT No.: PCT/JP2005/007891

§ 371 (c)(1),
(2), (4) Date: Jul. 21, 2006

(87) PCT Pub. No.: WO2005/109857

PCT Pub. Date: Nov. 17, 2005

(65) Prior Publication Data

US 2008/0226282 A1    Sep. 18, 2008

(30) Foreign Application Priority Data

May 7, 2004    (JP) .............................. 2004-138289

(51) Int. Cl.
*G03B 17/00*    (2006.01)
(52) U.S. Cl. ...................... 396/427; 348/143
(58) Field of Classification Search ................ 396/427, 396/428, 419; 348/143; 248/345
See application file for complete search history.

(56) References Cited

U.S. PATENT DOCUMENTS

| | | | | |
|---|---|---|---|---|
| 2,498,137 | A * | 2/1950 | Ryder | 396/425 |
| 5,240,220 | A * | 8/1993 | Elberbaum | 248/558 |
| 5,497,214 | A * | 3/1996 | Labree | 396/428 |
| 5,790,910 | A | 8/1998 | Haskin | |
| 6,254,116 | B1 * | 7/2001 | Szumlic et al. | 280/304.1 |
| 6,292,222 | B1 * | 9/2001 | Bernhardt | 348/375 |
| 2002/0051640 | A1 * | 5/2002 | Arbuckle et al. | 396/427 |
| 2004/0096209 | A1 * | 5/2004 | Toste et al. | 396/427 |
| 2005/0200751 | A1 * | 9/2005 | Weaver | 348/375 |

(Continued)

FOREIGN PATENT DOCUMENTS

GB     2 075 114 A    11/1981

(Continued)

OTHER PUBLICATIONS

European Search Report dated Aug. 11, 2009.

*Primary Examiner*—Christopher E Mahoney
*Assistant Examiner*—Leon W Rhodes
(74) *Attorney, Agent, or Firm*—Pearne & Gordon LLP

(57) ABSTRACT

A camera installation device has a camera installation base (12) and a camera support section (14). A coupling direction (X) between the camera support section (14) and the camera installation base (12) is inclined relative to the direction vertical to a camera installation surface (16). Further, in the camera installation device, the angle of the camera support section (14) relative to the camera installation base (12) on a coupling reference surface (Y) crossing a coupling direction (X) is variable depending on the angle of the installation surface (16). Preferably, an inclination angle in the coupling direction (X) is 45°, and the camera support section (14) is reversible on the coupling reference surface (Y). Further, the camera support section (14) can be installed on an upper side and a lower side of a camera (18). The camera installation device can be used in different installation places such as a wall surface and a ceiling.

3 Claims, 7 Drawing Sheets

U.S. PATENT DOCUMENTS

2006/0061656 A1* 3/2006 Lang et al. .................. 348/148
2007/0058039 A1* 3/2007 Clark ......................... 348/143

FOREIGN PATENT DOCUMENTS

| GB | 2 285 913 A | | 8/1995 |
| --- | --- | --- | --- |
| JP | 57-200069 | | 12/1982 |
| JP | 04-050594 A | | 2/1992 |
| JP | 5-191689 | | 7/1993 |
| JP | 05207340 A | * | 8/1993 |
| JP | 07-6882 U | | 1/1995 |
| JP | 2002-290774 | | 4/2002 |

* cited by examiner

CAMERA INSTALLATION DEVICE

TECHNICAL FIELD

The present invention relates to a camera installation device for installing a monitor camera or the like.

BACKGROUND ART

In the related art, a camera installation device for installing a monitor camera on a wall surface, a ceiling, etc. is used. In general, in the related art, different camera installation devices are used depending on the camera installation place. For example, different types of installation devices are used for installing on the wall surface and for installing on the ceiling even though the camera is the same.

FIG. 7 and FIG. 8 show examples of the camera installation device for the wall surface and for the ceiling. In FIG. 7, a wall surface installation base 100 is installed to a wall surface 102. The wall surface installation base 100 has an L-shape. A horizontal installation surface 104 is provided at a distal end of the wall surface installation base 100. A camera is installed on the installation surface 104.

On the other hand, in FIG. 8, a ceiling installation base 110 is installed on a ceiling 112. The ceiling installation base 112 has a rod shape. A horizontal installation surface 114 is provided at a lower end of the ceiling installation base 112. The camera is installed on the installation surface 114.

As shown in FIG. 7 and FIG. 8, a camera cable 120 is embedded into the wall surface or the ceiling separately from the camera installation bases 100, 110.

JP-A-5-191689 (pp. 2, FIG. 1) discloses a camera installation device that can be applied to the wall surface and the ceiling. In the same document, the camera installation base and the camera are coupled using a ball joint. The camera can be directed to desired directions by the ball joint. Accordingly, application to the wall surface and the ceiling is enabled.

In the camera installation device in the related art shown in FIG. 7 and FIG. 8, the wall surface installation base and the ceiling installation base are different from each other. A user has to select the different camera installation base depending on the mounting places. Therefore, the camera installation device in the related art is not convenient. The camera installation device in JP-A-5-191689 can be used both for the wall surface and for the ceiling. However, since it employs the ball joint, fixation is not ensured.

DISCLOSURE OF INVENTION

Problems to be Solved by the Invention

In view of such a background, it is an object of the present invention to provide a camera installation device that can be used at different installation places.

Means for Solving the Problems

A camera installation device according to the present invention includes: a camera installation base having an installation member to a camera installation surface; and a camera support section coupled to the camera installation base and configured to support the camera, and a coupling direction between the camera installation base and the camera support section is inclined relative to the direction vertical to the camera installation surface, and the angle of the camera support section with respect to the camera installation base on a coupling reference surface which intersects with the coupling direction is variable.

As described below, the present invention includes other aspects. Therefore, disclosure of the present invention is intended to provide part of the aspects, and not intended to limit the scope of the invention which is described and claimed here.

Figure 1:
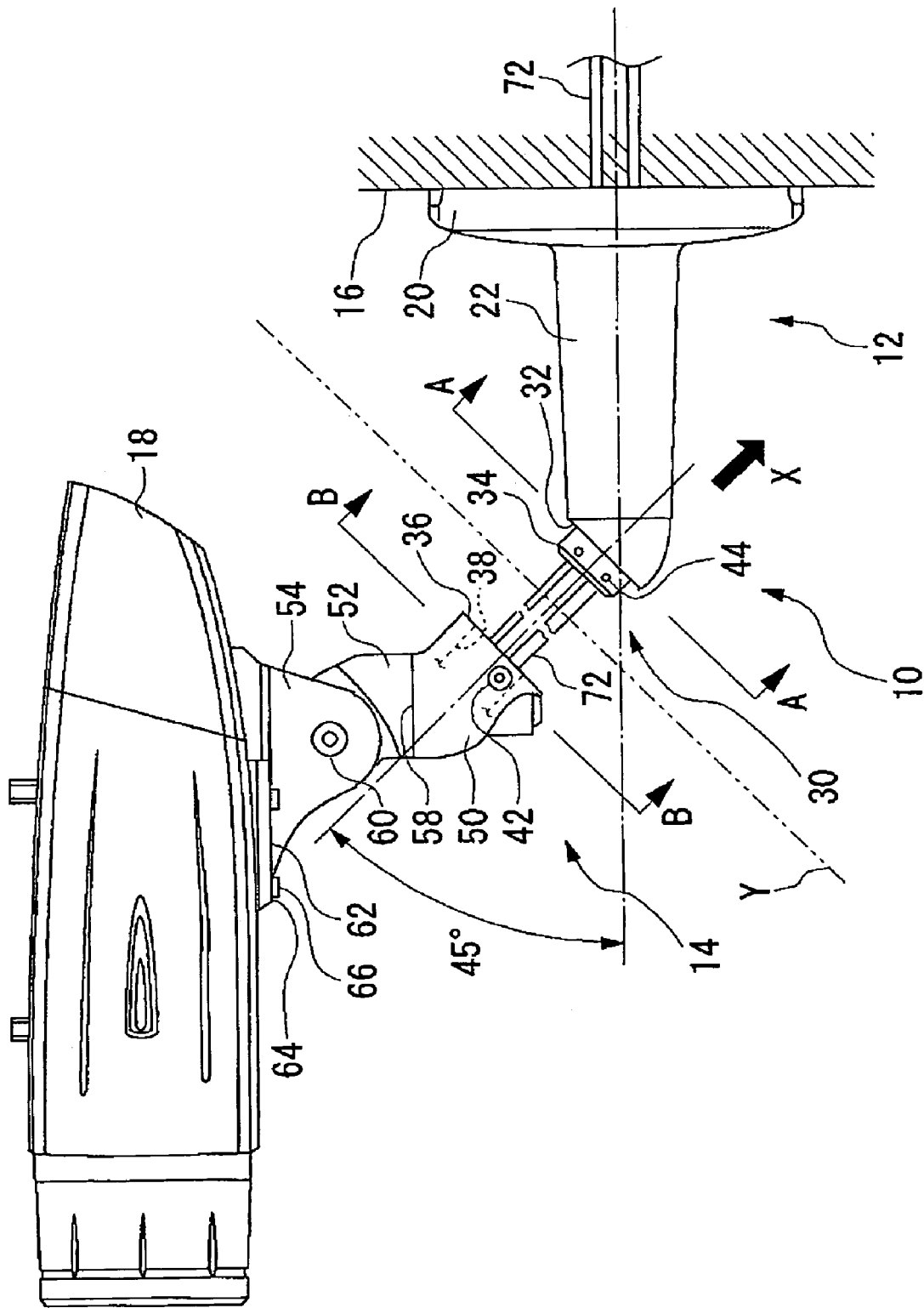
FIG. 1 is a front view of a camera installation device in a state of being installed on a wall surface according to an embodiment of the present invention.

REFERENCE NUMERALS 10 camera installation device
12 camera installation base
14 camera support section
16 installation surface
18 camera
20 installation member
22 arm member
30 coupling member
34 insertion portion
38 insertion hole
62 camera installation member
70 camera wiring hole
72 camera cable

BEST MODE FOR CARRYING OUT THE INVENTION

Detailed description of the present invention will be given below. However, the detailed description and the attached drawings are not intended to limit the invention. Instead, the scope of the invention is defined by attached claims.

A camera installation device includes: a camera installation base having an installation member for a camera installation surface; and a camera support section coupled to the camera installation base and configured so as to support a camera, and a coupling direction between the camera installation base and the camera support section is inclined relative to a direction vertical to the camera installation surface, and the angle of the camera support section with respect to the camera installation base on a coupling reference surface which intersects with the coupling direction can be changed or is variable.

In this arrangement, a posture of the camera can be maintained favorably by varying the angle of the camera support section relative to the camera installation base on the coupling reference surface according to the angle of the camera installation surface. Therefore, the camera installation device can be used on a plurality of installation surfaces having different angles such as the wall surface or the ceiling.

Preferably, the angle of inclination of the coupling direction is 45 degrees and the camera support section can be inverted or reversed on the coupling reference surface. In this arrangement, the posture of the camera can be maintained in the same posture in either cases where the camera is installed on two installation surfaces different in angle from each other by 90 degrees. The two installation surfaces different in angle by 90 degrees are typically the wall surface and the ceiling.

The camera support section may be configured so that it can be installed on an upper side and a lower side of the camera. In this arrangement, the camera may be oriented in the same direction in the vertical direction both in a state of being installed on the wall surface and in a state of being installed on the ceiling.

Preferably, a camera wiring hole is provided so as to communicate the camera installation base and the camera support section. In this arrangement, since exposure of the camera wiring can be reduced, an appearance image can be improved.

Figure 2:
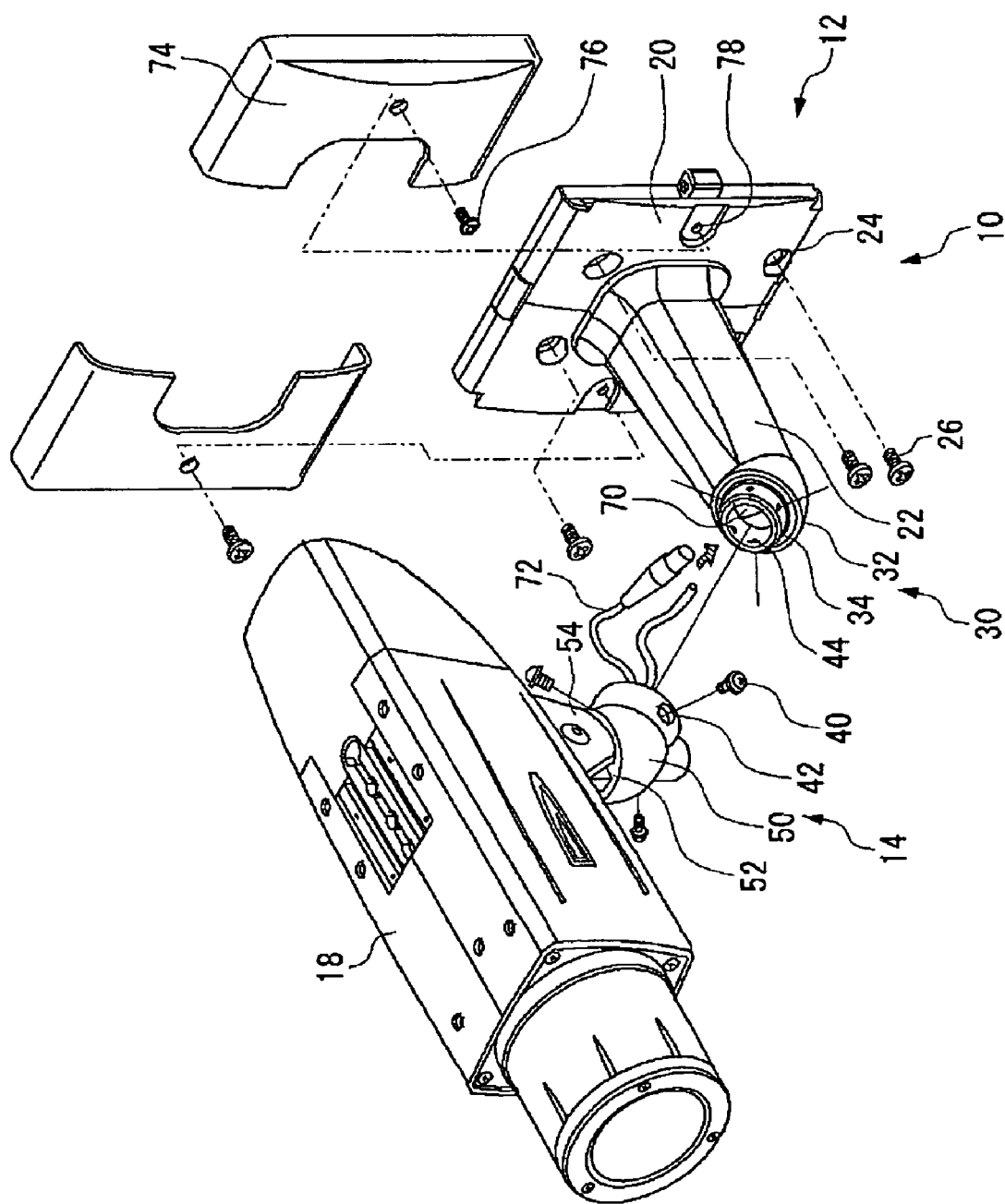
FIG. 2 is an exploded perspective view of the camera installation device according to the embodiment of the present invention in a state of being installed on the wall surface.

Referring now to the drawings, the camera installation device according to this embodiment will be described. In this embodiment, a single camera installation device can be used on two types of installation surfaces; that is; the wall surface and the ceiling. Referring to FIG. 1 and FIG. 2 showing a state of being installed on the wall surface, a structure of the camera installation device will be described in the following description. Then, the camera installation device in a state of being installed on the wall surface will be described. FIG. 1 is a front view of the camera installation device and FIG. 2 is an exploded perspective view.

As shown in the drawings, a camera installation device 10 generally includes a camera installation base 12 and a camera support section 14. The camera installation base 12 is installed on an installation surface 16 (wall surface), and the camera support section 14 is installed on a camera 18. The camera support section 14 is a component that is coupled to the camera installation base 12, and more specifically, the camera support section 14 is a camera platform. The camera support section may be integrated with the camera 18 within the scope of the present invention. The structure of the respective portions will be described in detail below.

The camera installation base 12 is formed of aluminum. The camera installation base 12 includes a plate-shaped installation member 20 and an arm member 22 projecting from a substantially center of the installation member 20. The installation member 20 is formed with four installation holes 24 so as to surround the arm member 22. Screws 26 are inserted into the installation holes 24 and are tightened to the installation surface 16. Accordingly, the installation member 20 is installed on the installation surface 16, and the installation base 12 is fixed to the installation surface 16. The arm member 22 extends from the substantially center of the installation member 20 vertically with respect to the installation surface 16. The arm member 22 extends horizontally in a state of being installed on the wall surface.

A coupling member 30 is provided at a distal end of the arm member 22. The arm member 22 is coupled to a proximal end of the camera support section 14 by the coupling member 30. In FIG. 1 and FIG. 2, the camera installation base 12 and the camera support section 14 are separately shown. However, in an actual state in use, the camera installation base 12 and the camera support section 14 are coupled by the coupling member 30.

The coupling member 30 has a fitting structure. That is, a cylindrical insertion portion 34 is projected from an end surface 32 of the arm member 22, and a circular insertion hole 38 is provided on an end surface 36 of the camera support section 14. The insertion portion 34 and the insertion hole 38 are substantially the same in diameter. The insertion portion 34 is inserted into the insertion hole 38. The end surface 36 of the camera support section 14 is aligned with the end surface 32 of the arm member 22. Accordingly, the camera support section 14 and the camera installation base 12 are coupled.

The insertion portion 34 is inclined relative to the horizontal direction. That is, a coupling direction X of the coupling member 30 is inclined relative to the horizontal direction. The angle of inclination of the coupling direction X is 45 degrees. In the state of being installed on the wall surface, as shown in the drawing, the coupling direction X is directed upward by 45 degrees relative to the horizontal direction The camera support section 14 and the camera installation base 12 are fixed at the coupling member 30 by screws 40. The three screws 40 are inserted into holes 42 of the camera support section 14, and are tightened into screw holes 44 of the insertion portion 34. As described later, in this embodiment, the camera support section 14 can be fixed at different angles relative to the camera installation base 12. This function is used for enabling installation on both of the wall surface and the ceiling.

The camera support section 14 couples the camera installation base 12 and the camera 18. The camera support section 14 includes a base member 50 and a pan rotary member 52 and a tilt rotary member 54. The base member 50 is coupled to the installation base 12 as described above. The pan rotary member 52 is installed to the base member 50 so as to be capable of rotating with respective thereto. The pan rotary member 52 is rotatable in the panning direction on a panning plane 58. The tilt rotary member 54 is mounted to the pan rotary member 52 so as to be capable of rotating with respect to the pan rotary member 52. The tilt rotary member 54 is rotatable in the tilting direction about the tilting axis 60. As shown in the drawing, a pan surface 58 is horizontal, and the tilting axis 60 is also horizontal. In this arrangement, the camera support section 14 supports the camera 18 so as to be capable of being rotated in the panning direction and in the tilting direction.

The tilt rotary member 54 of the camera support section 14 is provided with a camera installation member (installation plate) 62. As shown in the drawing, in the state of being installed on the wall surface, the camera installation member 62 is installed on a lower surface of the camera 18. The camera installation member 62 is formed with four mounting holes 64. Four screws 66 are inserted respectively into the four mounting-holes 64, and are tightened into the screw holes of the camera 18. Accordingly, the camera support section 14 is installed on the camera 18.

Interiors of the camera installation base 12 and camera support section 14 are hollows. Both hollows in the interiors of the both members communicate with each other. Accordingly, a camera wiring hole 70 is defined. A camera cable 72 passes through the camera wiring hole 70. The camera cable 72 includes cables such as a video cable and a power source cable. One end of the camera cable 72 is connected to the camera 18. The camera cable 72 extends from the camera installation base 12 to the inside of the installation surface 16.

The installation member 2Q of the camera installation base 12 is covered by a facing cover 74 formed of resin. The facing cover 74 is fixed to screw holes 78 of the installation member 20 with screws 76.

Figure 3:
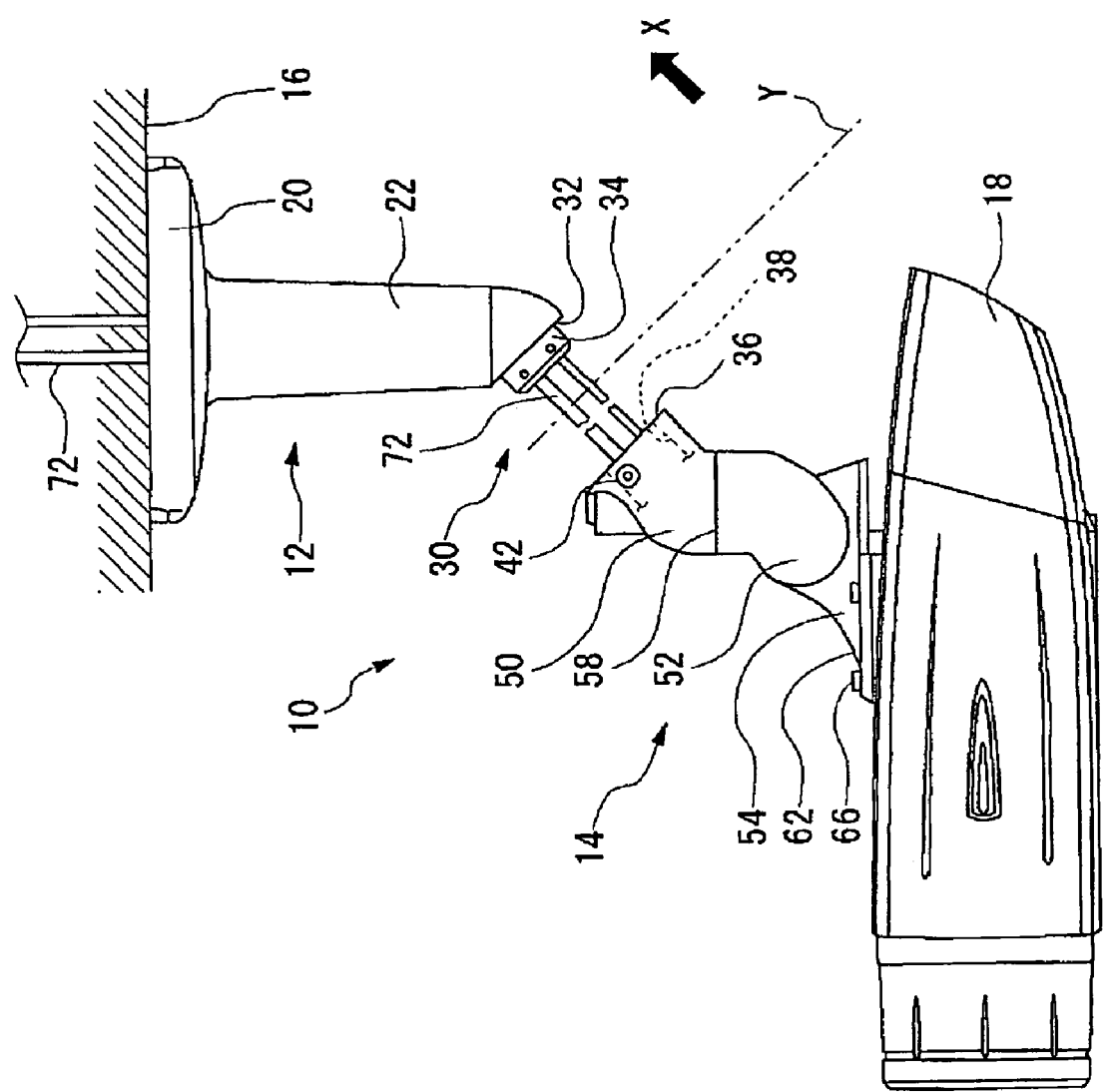
FIG. 3 is a front view of the camera installation device according to the embodiment of the present invention in a state of being installed on a ceiling.
Figure 4:
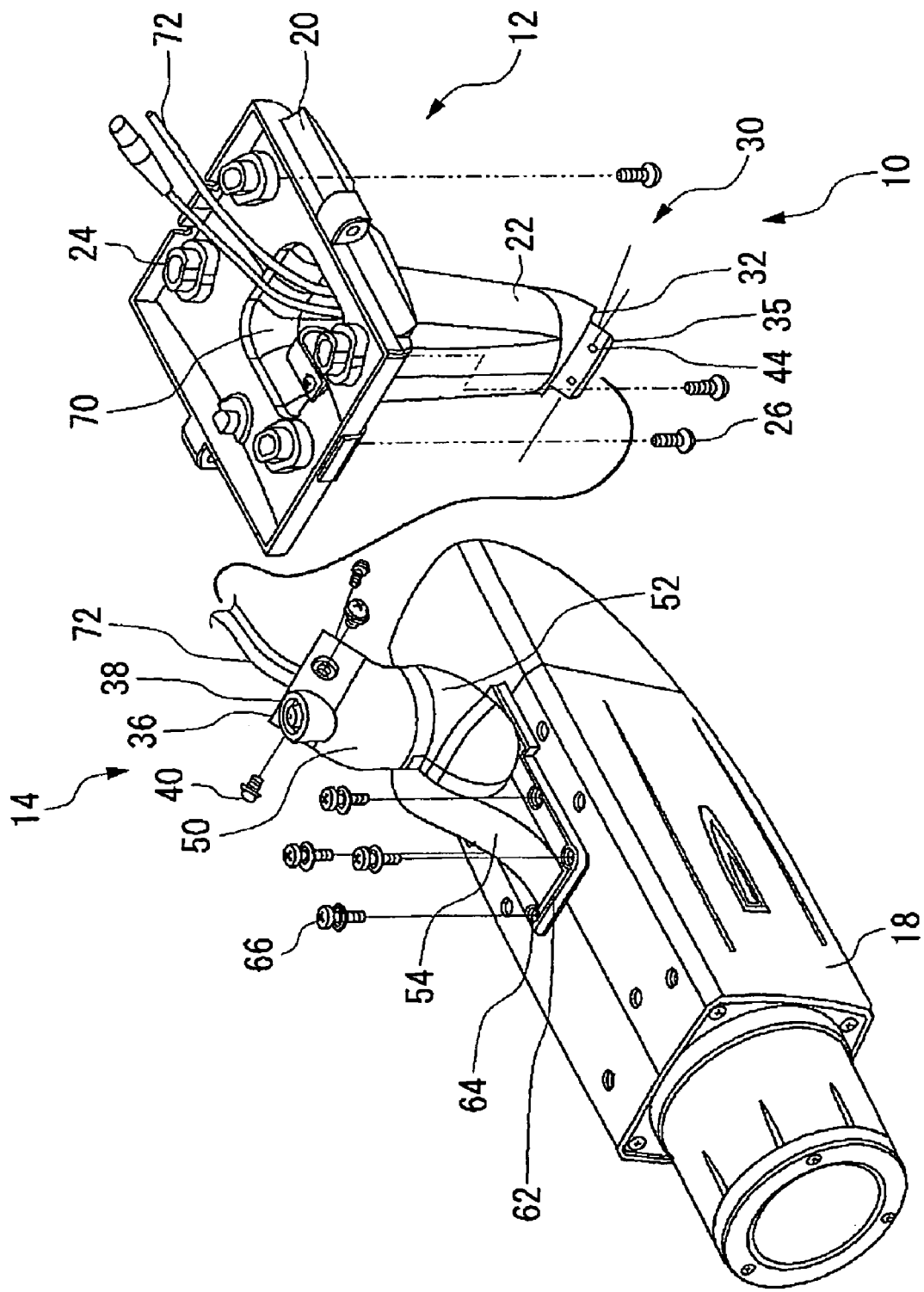
FIG. 4 is an exploded perspective view of the camera installation device according to the embodiment of the present invention in a state of being installed on the ceiling.

Referring to FIG. 1 and FIG. 2 showing the state of being installed on the wall surface, the structure of the camera installation device 10 has been described. Subsequently, referring to FIG. 3 and FIG. 4, a state in which the same camera installation device 10 is installed on the ceiling will be described. FIG. 3 is a front view of the camera installation device in a state of being installed on the wall surface. FIG. 4 is an exploded perspective view of the same.

As shown in the drawings, in the state of being installed on the ceiling, the installation member 20 of the camera installation base 12 is installed on the ceiling. The arm member 22 extends downward from the ceiling. In the same manner as in the state of being installed on the wall surface, the camera support section 14 is coupled to the distal end of the arm members 22. However, the angle of installation of the camera support section 14 to the camera installation base 12 is different between the state of being installed on the wall surface and the state of being installed on the ceiling.

The angle of installation of the camera support section 14 is the circumferential angle centered on a center axis line of the cylindrical shape of the insertion portion 34 of the coupling member 30. Therefore, the angle of installation of the camera support section 14 is an angle on a coupling reference surface Y which intersects with the coupling direction X. The coupling reference surface Y is a plane extending in parallel with a mating surface of the coupling member 30. In this embodiment, the angles of installation are shifted by 180 degrees between the state of being installed on the ceiling and the state of being installed on the wall surface, that is, it is installed in a state in which the camera support section 14 is directed in the opposite direction.

Figure 5A:
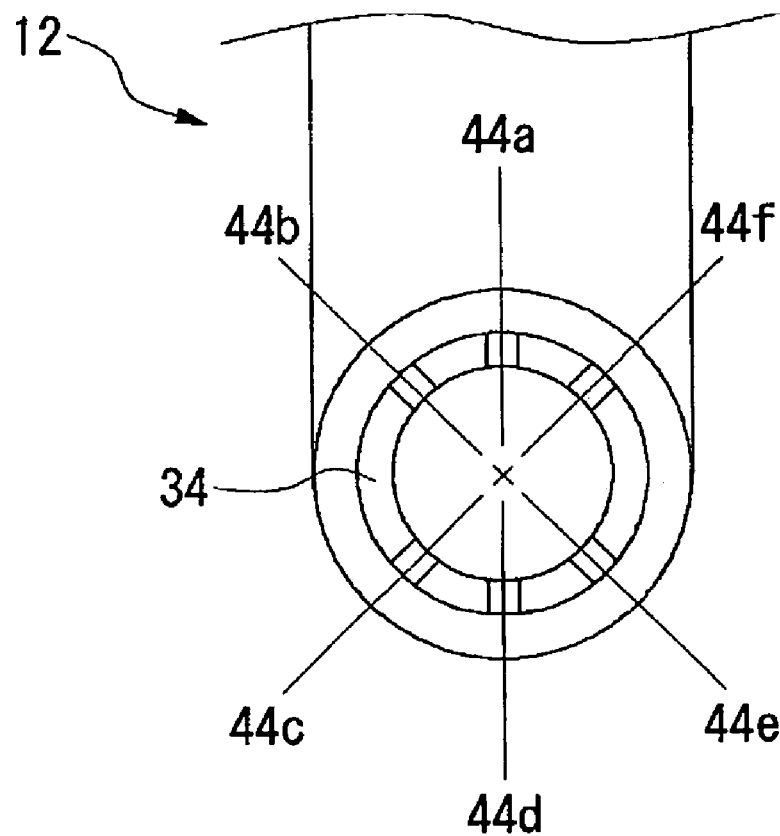
FIG. 5A is a drawing showing a structure of the camera installation base side of a coupling member.
Figure 5B:
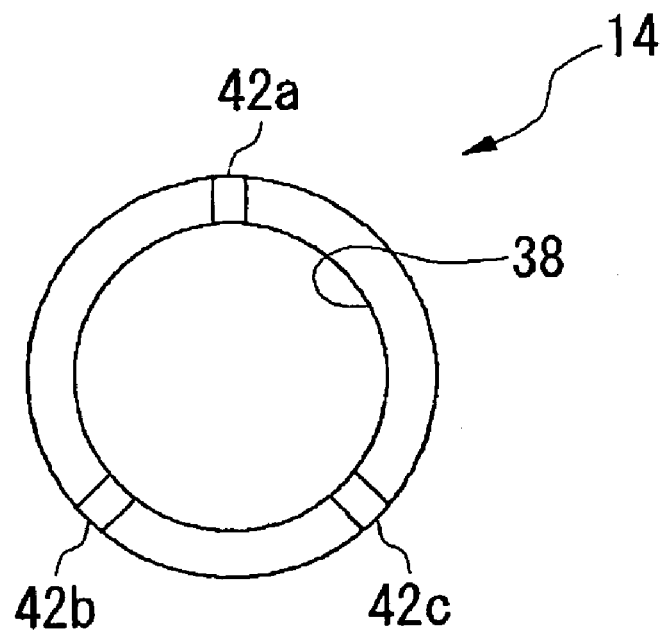
FIG. 5B is a drawing showing a structure of the camera support section side of the coupling member.

FIG. 5A and FIG. 5B show configurations of the coupling member 30 for enabling installation in the opposite or inverted direction as described above. FIG. 5A is a cross-sectional view of the insertion portion 34 of the arm member 22 taken along a line A-A in FIG. 1. As shown in the drawing, six screw holes 44a to 44f are provided at regular intervals of 60 degrees circumferentially of the cylindrical surface of the insertion portion 34. FIG. 5B is a cross-sectional view of the camera support section 14 taken along a line B-B in FIG. 1. As shown in the drawing, three holes 42a to 42c are provided at regular intervals of 120 degrees.

In the state of being installed on the wall surface, three every other screw holes 44a, 44c, 44e are used. The holes 42a, 42b, 42c of the camera support section 14 are aligned with the three screw holes 44a, 44c, 44e respectively. Then, three screws 40 are tightened therein. In contrast, in the state of being installed on the ceiling, the camera support section 14 is rotated by 180 degrees. The screw holes 44d, 44f, 44b are aligned with the holes 42a, 44b, 44c and the three screws 40 are tightened therein. The holes 42a, 42b, 42c are aligned with the screw holes on the opposite sides for the state of being installed on the wall surface and for the state of being installed on the ceiling surface. Accordingly, the angle of installation of the camera support section 14 can be shifted by 180 degrees.

Referring back to FIG. 3, by having shifted the angle of installation of the camera support section 14, the camera support section 14 in the state of being installed on the ceiling is inverted from the camera support section 14 in the state of being installed on the wall surface in the vertical direction.

Then, the camera installation member (installation plate) 62 of the camera support section 14 is mounted to an upper surface of the camera 18. Accordingly, the posture of the camera 18 is the same in the state of being installed on the ceiling and in the state of being installed on the wall surface.

Figure 6A:
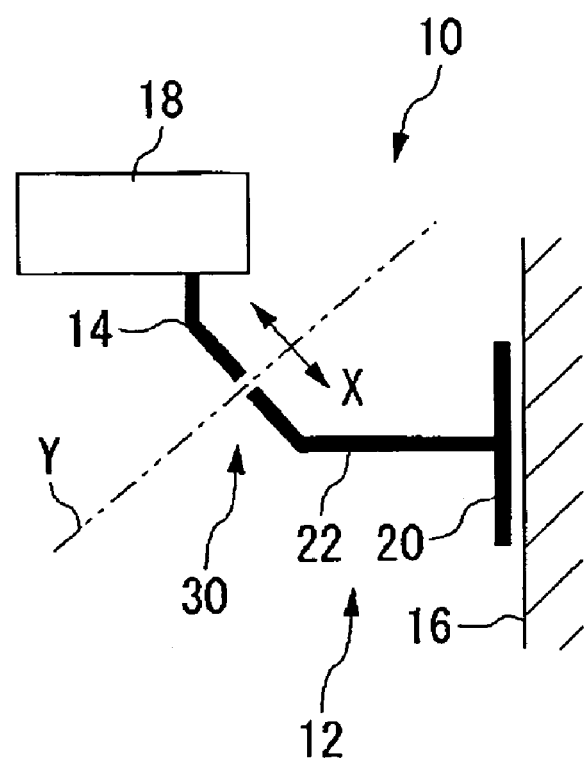
FIG. 6A is a pattern diagram of the camera installation device in a state of being installed on the wall surface.
Figure 6B:
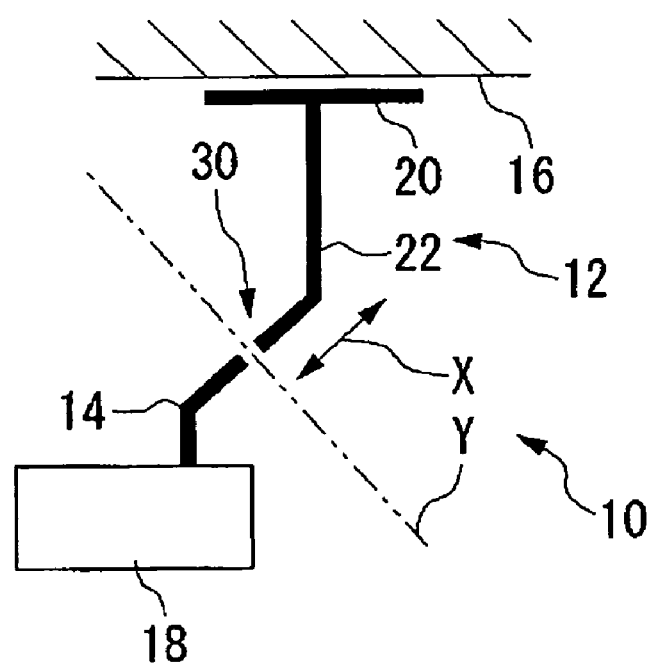
FIG. 6B is a pattern diagram of the camera installation device in a state of being installed on the ceiling.

Referring now to FIG. 6A and FIG. 6B, a principle of the camera posture being maintained as described above will be described more in detail. FIG. 6A and FIG. 6B show patterns of the camera installation device in the state of being installed on the wall surface and the state of being installed on the ceiling. The camera installation base 12 and the camera support section 14 are shown by thick lines.

The direction of the camera support section 14 here is considered on a vertical plane passing through the camera installation base 12 and the camera support section 14. When FIG. 6A and FIG. 6B are compared, change from FIG. 6A to FIG. 6B will be made as follows. In FIG. 6B, in association with the change of the angle of installation surface by 90 degrees, the direction of the camera support section 14 is shifted by 90 degrees. Further, in FIG. 6B, the camera support section 14 is rotated by 180 degrees on a plane intersecting with the coupling direction X, thereby the direction of the camera support section 14 on the vertical plane is shifted by 90 degrees.

Figure 7:
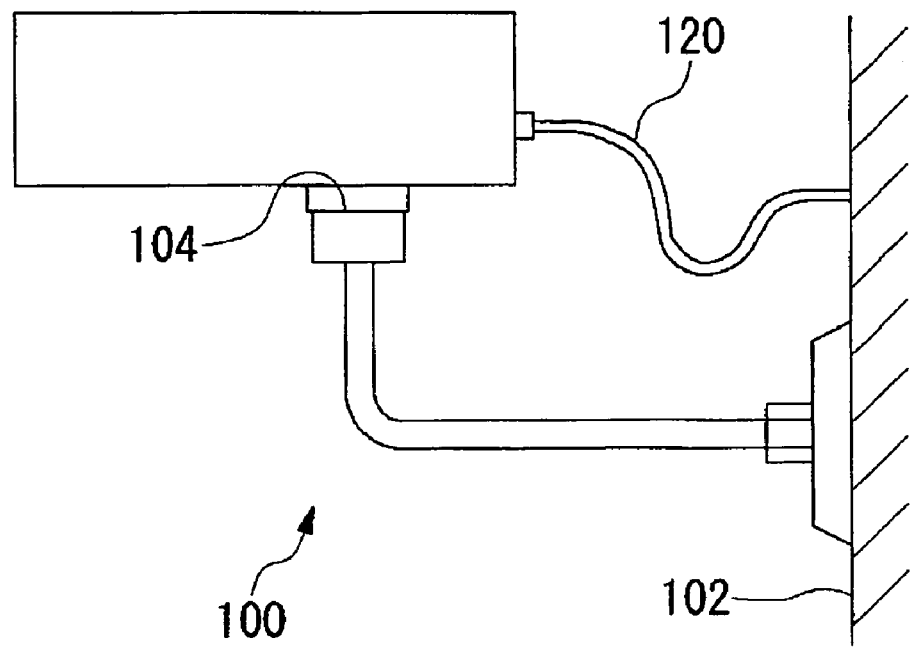
FIG. 7 is a drawing showing a camera installation device for installing on the wall surface in the related art.
Figure 8:
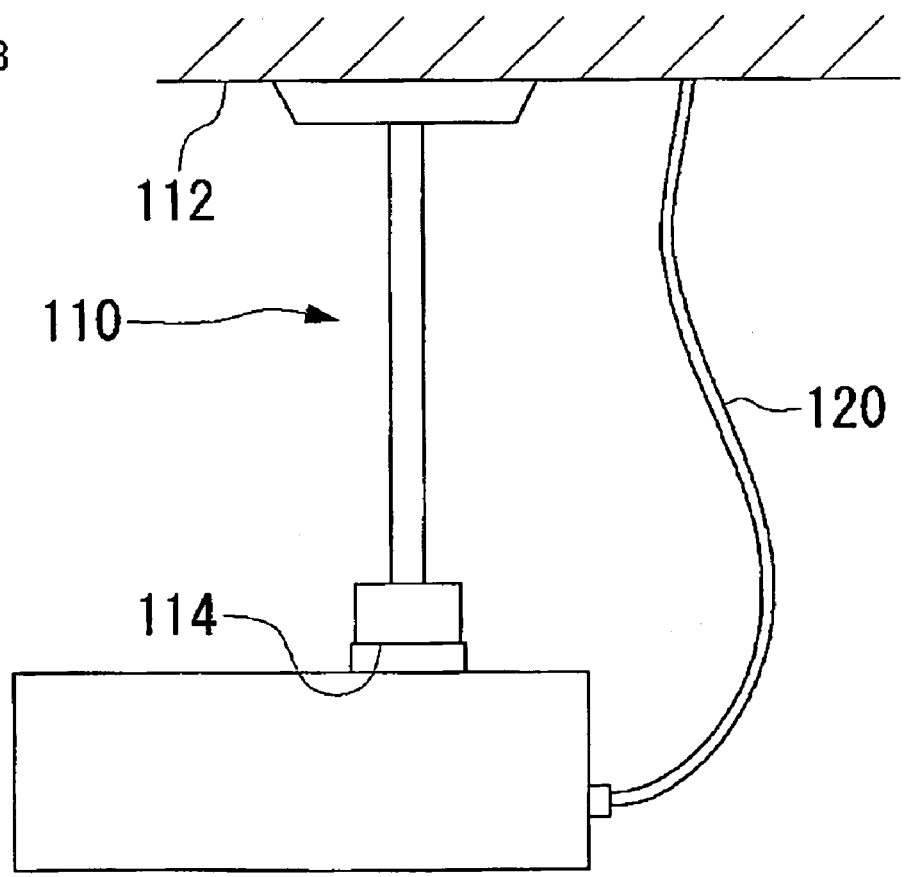
FIG. 8 is a drawing showing a camera installation device for installing on the ceiling in the related art.

Therefore, by the change of the installation surface and the rotation of the camera support section 14, the direction of the camera support section 14 on the vertical plane is shifted by 180 degrees as shown in the drawings. In other words, the vertical direction of the camera support section 14 is inverted. Accordingly, the same posture of the camera 18 can be maintained in the state of being installed on the wall surface and in the state of being installed on the ceiling. In other words, the function of two types of the camera installation devices in the related art as shown in FIG. 7 and FIG. 8 can be achieved with a single camera installation device 10 in this embodiment.

As described thus far, according to the camera installation device 10 in this embodiment of the present invention, the coupling direction X between the camera installation base 12 and the camera support section 14 (camera platform) is inclined relative to the direction vertical to the camera installation surface 16. In addition, the camera installation device 10 is configured so that the angle of the camera support section 14 relative to the camera installation base 12 on the coupling reference surface Y which intersects with the coupling direction X can be varied. In this arrangement, by varying the angle of the camera support section 14 relative to the camera installation base 12 on the coupling reference surface Y according to the change of the angle of the camera installation surface 16, the camera 18 can be maintained in the preferable posture. Therefore, the camera installation device 10 can be used on a plurality of installation surfaces different in angle such as the wall surface and the ceiling.

In this embodiment, the angle of inclination of the coupling direction X is 45 degrees, and the camera support section 14 can be inverted on the coupling reference surface Y. Accordingly, the camera 18 can be maintained in the same posture irrespective of whether the camera is installed on either one of the two installation surfaces being different in angle from each other by 90 degrees. The two installation surfaces are typically the wall surface and the coiling described above.

In this embodiment, the camera support section 14 is configured so as to be capable of being mounted on the upper side and the lower side of the camera 18. In this arrangement, the camera may be oriented in the same direction in the vertical direction both in a state of being installed on the wall surface and in a state of being installed on the ceiling.

In this embodiment, the camera wiring hole is provided so as to communicate the camera installation base 12 and the camera support section 14. In this arrangement, exposure of the camera wiring can be reduced, thereby improving the appearance image thereof.

The preferred embodiments of the present invention which are considered at this moment have been described thus far. However, it is understood that various modifications may be made for the embodiments, and the attached claims are intended to include all these modifications within the real spirit and scope of the present invention.

INDUSTRIAL APPLICABILITY

The camera installation device of the present invention is effective as the installation device for the monitor camera or the like.

The invention claimed is:

1. A camera installation device comprising:
   a camera installation base having an installation member for a camera installation surface; and
   a camera support section coupled to the camera installation base and configured so as to support the camera, the camera support section having a pan rotary section and a tilt rotary section,
   wherein the camera installation base and the camera support section are coupled by a coupling section having a fitting structure; and
   wherein a coupling direction of the fitting structure between the camera installation base and the camera support section is inclined relative to a direction vertical to the camera installation surface, and the coupling angle of the camera support section with respect to the camera installation base is variable, the coupling angle of the camera support section with respect to the camera installation base is defined as an angle on a coupling reference surface which intersects with the coupling direction, and the coupling angle of the camera support section with respect to the camera installation base is varied by changing an installation angle of the coupling section with the fitting structure between the camera support section and the camera installation base, and
   wherein the angle of the inclination of the coupling direction is 45 degrees, and the installation angle is changed by 180 degrees between a state of the camera installation base being installed on a ceiling and a state of the camera installation base being installed on a wall surface.

2. The camera installation device according to claim 1, wherein the camera support section is configured so that it can be installed on either an upper side or a lower side of the camera.

3. The camera installation device according to claim 1, wherein a camera wiring hole is provided so as to communicate the camera installation base and the camera support section.

* * * * *